(12) United States Patent
Luttik et al.

(10) Patent No.: US 12,716,597 B2
(45) Date of Patent: Aug. 25, 2026

(54) MULTI-STAGE LIQUID DESICCANT DEHUMIDIFICATION SYSTEMS AND METHODS

(71) Applicant: Copeland LP, Sidney, OH (US)

(72) Inventors: Peter Luttik, Wilmington, MA (US); Joseph H. Amend, IV, Yellow Springs, OH (US); Jason Warner, Greenville, OH (US)

(73) Assignee: Copeland LP, Sidney, OH (US)

( * ) Notice: Subject to any disclaimer, the term of this patent is extended or adjusted under 35 U.S.C. 154(b) by 348 days.

(21) Appl. No.: 18/391,439

(22) Filed: Dec. 20, 2023

(65) Prior Publication Data

US 2025/0207791 A1 Jun. 26, 2025

(51) Int. Cl.

| | |
|---|---|
| ***F24F 3/14*** | (2006.01) |
| ***B01D 53/14*** | (2006.01) |
| ***B01D 53/18*** | (2006.01) |
| ***B01D 53/26*** | (2006.01) |
| ***F24F 13/30*** | (2006.01) |

(52) U.S. Cl.

CPC ........ *F24F 3/1417* (2013.01); *B01D 53/1412* (2013.01); *B01D 53/1425* (2013.01); *B01D 53/18* (2013.01); *B01D 53/263* (2013.01); *F24F 13/30* (2013.01); *B01D 2252/10* (2013.01); *B01D 2257/80* (2013.01); *B01D 2258/06* (2013.01); *F24F 2003/1435* (2013.01); *F24F 2003/1446* (2013.01); *F24F 2003/1458* (2013.01)

(58) Field of Classification Search

CPC ... F24F 3/1411; F24F 3/1417; B01D 53/1412; B01D 53/18; B01D 53/263; B01D 53/1425

See application file for complete search history.

(56) References Cited

U.S. PATENT DOCUMENTS

| | | | |
|---|---|---|---|
| 2,537,276 | A | 1/1951 | Mcmahon et al. |
| 3,814,172 | A | 6/1974 | Shore |
| 3,973,621 | A | 8/1976 | Bow et al. |
| 4,373,347 | A | 2/1983 | Howell et al. |
| 4,582,126 | A | 4/1986 | Corey |
| 4,653,287 | A | 3/1987 | Martin, Jr. |

(Continued)

FOREIGN PATENT DOCUMENTS

| | | |
|---|---|---|
| CN | 102213471 B | 1/2013 |
| CN | 103063076 B | 3/2015 |

(Continued)

*Primary Examiner* — Robert A Hopkins

(74) *Attorney, Agent, or Firm* — Armstong Teasdale LLP

(57) ABSTRACT

An air treatment system includes a three-way heat exchanger, a heat transfer fluid loop, and a pre-treatment heat exchanger positioned on the heat transfer fluid loop. The three-way heat exchanger is operable to transfer heat and moisture between air, a liquid desiccant, and a heat transfer fluid. The heat transfer fluid loop circulates the heat transfer fluid between the three-way heat exchanger and a second heat exchanger operable to transfer heat between the heat transfer fluid and a third working fluid. The pre-treatment heat exchanger is positioned on the heat transfer fluid loop between the second heat exchanger and the three-way heat exchanger and is operable to transfer heat between the air and the heat transfer fluid upstream from the three-way heat exchanger.

19 Claims, 9 Drawing Sheets

(56) References Cited

U.S. PATENT DOCUMENTS 4,903,503 A 2/1990 Meckler
4,941,324 A 7/1990 Peterson et al.
5,005,371 A 4/1991 Yonezawa et al.
5,320,166 A 6/1994 Swenson
5,943,874 A 8/1999 Maeda
6,039,112 A 3/2000 Ruppel et al.
6,134,903 A 10/2000 Potnis et al.
6,178,762 B1 1/2001 Flax
6,216,483 B1 4/2001 Potnis et al.
6,282,919 B1 9/2001 Rockenfeller et al.
6,315,257 B1 11/2001 Fennesz
6,494,053 B1 12/2002 Forkosh et al.
6,497,107 B2 12/2002 Maisotsenko et al.
6,837,056 B2 1/2005 Potnis et al.
6,848,265 B2 2/2005 Lowenstein et al.
6,892,797 B2 5/2005 Beddome et al.
7,086,249 B2 8/2006 Bae et al.
7,147,071 B2 12/2006 Gering et al.
7,163,052 B2 1/2007 Taras et al.
7,260,945 B2 8/2007 Landry
7,269,966 B2 9/2007 Lowenstein et al.
7,306,650 B2 12/2007 Slayzak et al.
7,398,819 B2 7/2008 Taras et al.
7,806,171 B2 10/2010 Taras et al.
7,819,177 B2 10/2010 Beamer et al.
7,905,107 B2 3/2011 Forkosh et al.
8,171,986 B2 5/2012 Klein
8,171,987 B2 5/2012 Jiang et al.
8,205,668 B2 6/2012 Freese, V
8,222,514 B2 7/2012 Hanoka
8,268,060 B2 9/2012 Hargis et al.
8,800,308 B2 8/2014 Vandermeulen et al.
8,999,045 B2 4/2015 Ericson et al.
9,101,874 B2 8/2015 Vandermeulen
9,109,808 B2 8/2015 Gerber et al.
9,130,503 B2 9/2015 Vandermeulen
9,140,471 B2 9/2015 Kozubal et al.
9,234,665 B2 1/2016 Erb et al.
9,267,696 B2 2/2016 Gerlach et al.
9,276,274 B2 3/2016 Boersma et al.
9,423,140 B2 8/2016 Betts et al.
9,470,426 B2 10/2016 Vandermeulen
9,506,697 B2 11/2016 Vandermeulen
9,518,765 B2 12/2016 Laughman et al.
9,631,848 B2 4/2017 Vandermeulen et al.
9,709,285 B2 7/2017 Vandermeulen
9,746,174 B2 8/2017 Wilhelm et al.
9,810,439 B2 11/2017 Coutu et al.
10,012,444 B2 7/2018 Eplee
10,024,558 B2 7/2018 Vandermeulen
10,041,708 B2 8/2018 Sedlak et al.
10,323,867 B2 6/2019 Vandermeulen
10,352,574 B2 7/2019 Hamlin et al.
10,386,084 B2 8/2019 Bahar et al.
10,465,996 B2 11/2019 Wintersteen et al.
10,619,867 B2 4/2020 Vandermeulen
10,655,870 B2 5/2020 Lowenstein
10,712,024 B2 7/2020 LePoudre et al.
10,739,079 B2 8/2020 Lowenstein
10,782,045 B2 9/2020 LePoudre et al.
10,905,997 B2 2/2021 McGee et al.
10,921,001 B2 2/2021 Allen et al.
10,941,948 B2 3/2021 Vandermeulen et al.
10,950,877 B2 3/2021 Staeck
10,962,252 B2 3/2021 LePoudre et al.
11,022,330 B2 6/2021 Allen et al.
11,029,045 B2 6/2021 Woods et al.
11,035,618 B2 6/2021 LePoudre et al.
11,092,349 B2 8/2021 LePoudre et al.
11,131,468 B2 9/2021 Edström et al.
11,143,467 B2 10/2021 Lynn et al.
11,408,681 B2 8/2022 LePoudre
11,608,996 B2 3/2023 Meggers et al.
11,737,239 B2 8/2023 LePoudre
11,781,775 B2 10/2023 Abdel-Salam et al.
11,815,283 B2 11/2023 Moghaddam et al.
2003/0029185 A1 2/2003 Kopko
2004/0211207 A1 10/2004 Forkosh et al.
2006/0201188 A1 9/2006 Kopko
2010/0090356 A1 4/2010 Sines et al.
2010/0132930 A1 6/2010 Izenson et al.
2011/0139218 A1 6/2011 Hanoka et al.
2012/0006483 A1 1/2012 Hanoka et al.
2013/0227982 A1 9/2013 Forkosh
2014/0260367 A1 9/2014 Coutu et al.
2015/0260420 A1 9/2015 Forkosh
2015/0300754 A1 10/2015 Vandermeulen et al.
2016/0138817 A1 5/2016 Hamlin et al.
2016/0377302 A1 12/2016 Hamlin et al.
2017/0106639 A1 4/2017 Vandermeulen et al.
2017/0205090 A1 7/2017 Hollering et al.
2017/0205154 A1 7/2017 Torre La et al.
2017/0363305 A1 12/2017 Hamlin et al.
2018/0156544 A1 6/2018 Alahyari et al.
2019/0145640 A1* 5/2019 Vandermeulen ......... F24F 11/65 62/94
2019/0154281 A1 5/2019 Rosenblum et al.
2019/0162429 A1 5/2019 Armatis et al.
2020/0096212 A1 3/2020 LePoudre
2020/0173671 A1 6/2020 Rowe et al.
2020/0182493 A1 6/2020 Luttik
2020/0363091 A1 11/2020 Umekage et al.
2022/0003464 A1 1/2022 Sakaguchi
2022/0099390 A1 3/2022 Dean
2022/0376329 A1 11/2022 Nakamura et al.
2022/0393260 A1 12/2022 Nakamura et al.

FOREIGN PATENT DOCUMENTS

CN 105737302 A 7/2016
DE 102006024796 B4 11/2009
EP 1810856 A3 11/2008
EP 1769207 B1 4/2009
EP 2309193 A1 4/2011
EP 2966386 A1 1/2016
EP 2796802 B1 3/2016
EP 2960953 B1 4/2018
EP 3117157 B1 8/2018
EP 3361171 B1 8/2019
EP 3764021 A1 1/2021
FR 2886388 B1 10/2007
GB 479311 A 2/1938
GB 757856 A 9/1956
SG 10201605802 A1 2/2017
WO 1995010746 A1 4/1995
WO 1996019708 A1 6/1996
WO 2001073366 A1 10/2001
WO 2013094206 A1 6/2013
WO 2013172789 A1 11/2013
WO 2015086915 A1 6/2015
WO 2017185002 A1 10/2017
WO 2017185005 A1 10/2017
WO 2018191805 A1 10/2018
WO 2019162949 A1 8/2019
WO 2020026040 A1 2/2020
WO 2020026084 A3 5/2020
WO 2022216155 A1 10/2022

* cited by examiner

MULTI-STAGE LIQUID DESICCANT DEHUMIDIFICATION SYSTEMS AND METHODS

FIELD

The field relates generally to heating, ventilation, and air conditioning (HVAC) systems, and more particularly, to HVAC systems and methods that include a liquid desiccant dehumidification sub-system.

BACKGROUND

Heating, ventilation, and air conditioning (HVAC) systems are known for their heating, cooling, and moisture removal capabilities for treating outside air that is circulated through an indoor space. The vapor compression cycle is widely used in HVAC systems to regulate the temperature and humidity of the outside air. Typically, outside air is cooled below its dew point to allow moisture in the air to condense on an evaporator coil, thus dehumidifying the air. Since this process often leaves the dehumidified air at an uncomfortably cold temperature, the air is then reheated to a temperature more comfortable to a user. The process of overcooling and reheating the air can become very energy-intensive and costly.

In some applications, HVAC systems include a vapor compression system used in combination with a liquid desiccant dehumidification system to remove moisture from the outside air without cooling it below its dew point. Such systems incorporate an efficiency advantage in the ability of liquid desiccants to dehumidify the air to dew points lower than the true temperature of the liquid desiccant. Typical air-to-refrigerant heat exchangers (e.g., evaporator coils) or chilled water heat exchangers (e.g., chilled water coils), on the other hand, can only dehumidify the air to dew points that nearly reach the inlet temperature of the working fluid (e.g., expanded refrigerant or chilled water). Liquid desiccants therefore facilitate achieving a desired dew point of the air at higher operating temperatures. Less energy is required to cool the liquid desiccant and the vapor compression system used in conjunction with the liquid desiccant system can be more efficiently operated because the saturated evaporating temperature of the working fluid can be much higher than that of other air conditioners (e.g., evaporator coils or chilled water coils) in which liquid desiccant is not used.

While dehumidification systems that utilize liquid desiccant are efficient over other air conditioning and dehumidification systems, there is an ongoing need for improvements in the design and/or manufacturability of liquid desiccant dehumidification equipment and systems that facilitate reducing costs and/or optimizing operation and efficiency of the heat exchanger. In particular, there is an ongoing need to optimally balance system efficiency, equipment size (footprint), and manufacturing and operational costs of liquid desiccant dehumidification systems.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect is an air treatment system including a three-way heat exchanger, a heat transfer fluid loop, and a pre-treatment heat exchanger positioned on the heat transfer fluid loop. The three-way heat exchanger is operable to transfer heat and moisture between air, a liquid desiccant, and a heat transfer fluid. The heat transfer fluid loop circulates the heat transfer fluid between the three-way heat exchanger and a second heat exchanger operable to transfer heat between the heat transfer fluid and a third working fluid. The pre-treatment heat exchanger is positioned on the heat transfer fluid loop between the second heat exchanger and the three-way heat exchanger and is operable to transfer heat between the air and the heat transfer fluid upstream from the three-way heat exchanger.

Another aspect is a heating, ventilation, and air conditioning (HVAC) system including a refrigerant sub-system and an air treatment sub-system. The refrigerant sub-system is operable to circulate a refrigerant between an evaporator and a condenser. The air treatment sub-system includes a three-way heat exchanger operable to transfer heat and moisture between air, a liquid desiccant, and a heat transfer fluid, a heat transfer fluid loop for circulating the heat transfer fluid between the three-way heat exchanger and the evaporator for transferring heat between the heat transfer fluid and the refrigerant. The HVAC system also includes a pre-treatment heat exchanger operable to transfer heat between the air and one of the refrigerant and the heat transfer fluid upstream from the three-way heat exchanger.

Another aspect is a method of operating an air treatment system. The method includes: channeling a liquid desiccant and a heat transfer fluid to a three-way heat exchanger; pre-treating an inlet air stream using a pre-treatment heat exchanger upstream from the three-way heat exchanger to lower at least one of a temperature and a humidity of the inlet air stream; and channeling the pre-treated air stream to the three-way heat exchanger for transferring heat and moisture between the liquid desiccant, the heat transfer fluid, and the pre-treated air stream, producing a treated air stream.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the drawings.

DETAILED DESCRIPTION

Figure 1:
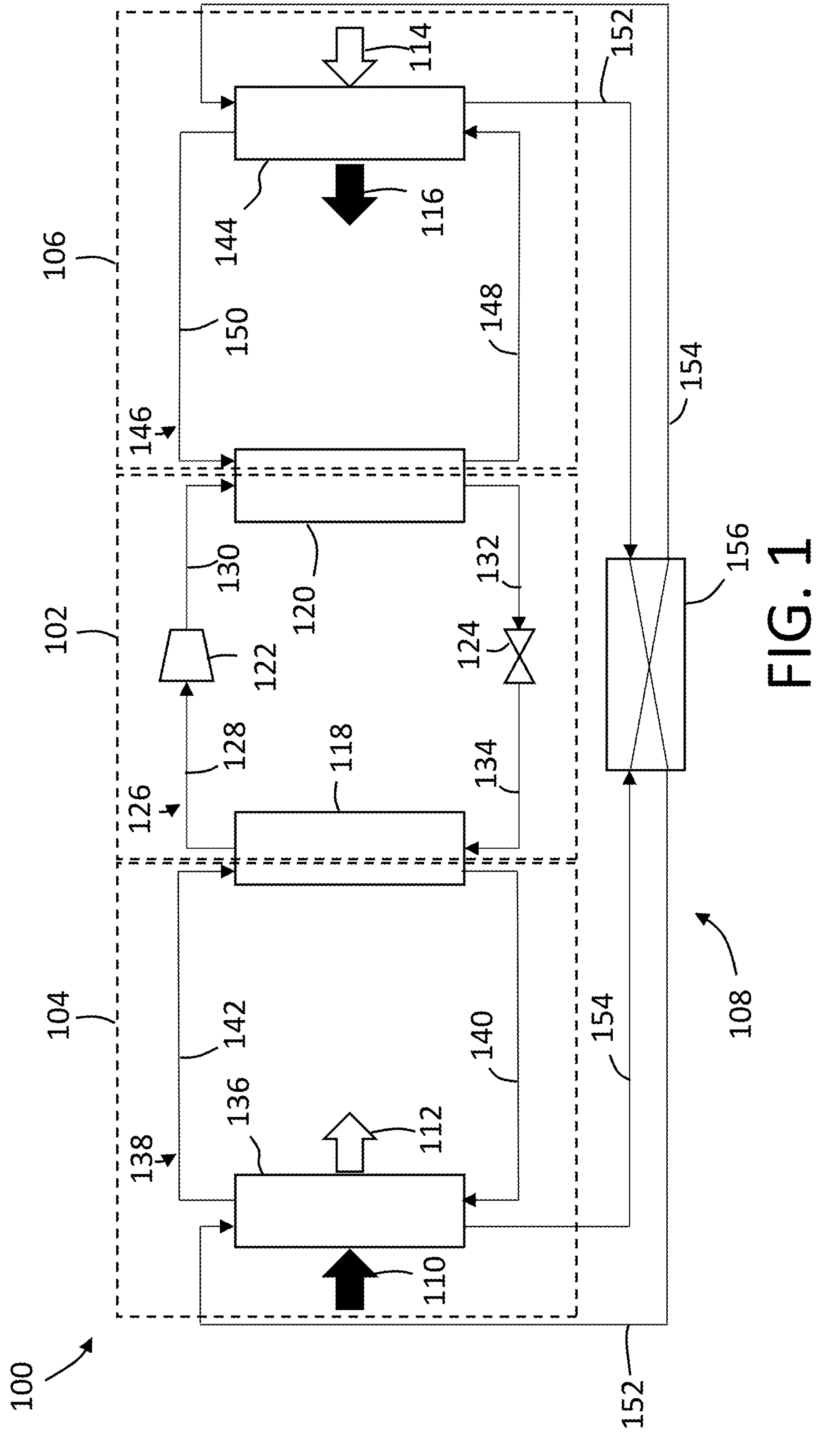
FIG. 1 is a schematic flow diagram of a heating, ventilation, and air conditioning (HVAC) system.

FIG. 1 is a schematic diagram of a heating, ventilation, and air conditioning (HVAC) system 100. The HVAC system 100 includes sub-systems 102-106 and a liquid desiccant circuit 108 which facilitate the heating, cooling, and moisture removal capabilities of the system 100. The sub-systems of the HVAC system 100 include a refrigerant sub-system 102, a conditioner (or dehumidification) sub-system 104, and a regenerator (or regeneration) sub-system 106. The conditioner sub-system 104 and the regenerator sub-system 106 are usable to respectively treat first and second inlet air streams 110 and 114, and may be referred to herein as air treatment sub-systems 104 and 106. The HVAC system 100 may include additional components or other components than those shown and described with reference to FIG. 1.

In an example operating mode of the HVAC system 100, the conditioner sub-system 104 removes heat from the first inlet air stream 110 and channels a conditioned outlet air stream 112 to a conditioned space (not shown), such as an interior of a building structure or vehicle. The conditioned outlet air stream 112 exiting the conditioner sub-system 104 may have a lower temperature than the first inlet air stream 110. Heat removed from the first inlet air stream 110 is transferred from the conditioner sub-system 104 to the refrigerant sub-system 102. Heat transferred to the refrigerant sub-system 102 may be transferred to a sacrificial fluid (e.g., outdoor air) stream. Additionally and/or alternatively, heat from the refrigerant sub-system 102 may be transferred to the regenerator sub-system 106, which may transfer the heat into the second inlet air stream 114 and channels a heated outlet air stream 116 to the atmosphere.

The refrigerant sub-system 102 includes an evaporator 118, a condenser 120, a compressor 122, and an expansion valve 124. The compressor 122 may be any suitable compressor including, but not limited to, scroll, reciprocating, rotary, screw, and centrifugal compressors. The expansion valve 124 may be any suitable expansion valve, such as a thermal expansion valve. The expansion valve 124 may alternatively be any suitable expansion device, such as an orifice or capillary tube for example. The refrigerant sub-system 102 also includes a refrigerant loop 126 that circulates a working fluid, such as a refrigerant, between the evaporator 118, the compressor 122, the condenser 120, and the expansion valve 124. The refrigerant sub-system 102 may include additional components or other components than those shown and described with reference to FIG. 1.

In operation of the refrigerant sub-system 102, the refrigerant in the loop 126 is channeled as a low pressure gas refrigerant 128 toward the compressor 122. The compressor 122 compresses the gas refrigerant 128, which raises the temperature and pressure of the refrigerant. Pressurized, high temperature gas refrigerant 130 exits the compressor 122 and is channeled toward the condenser 120, where the high pressure gas refrigerant 130 is condensed to a high pressure liquid refrigerant 132. The liquid refrigerant 132 exiting the condenser 120 is channeled toward the expansion valve 124 that reduces the pressure of the liquid. The reduced pressure fluid refrigerant 134, which may be a gas or a mixture of gas and liquid after passing through the expansion valve 124, is then channeled toward the evaporator 118. The fluid refrigerant 134 evaporates to a gas in the evaporator 118, exiting the evaporator as the low pressure gas refrigerant 128. The gas refrigerant 128 is then channeled back toward the compressor 122, where the gas refrigerant 128 is again compressed and the process repeats. Circulation of the refrigerant in the loop 126 may be driven by the compressor 122, and, more particularly, by a pressure differential that exists between the pressurized, high temperature gas refrigerant 130 exiting the compressor 122 and the low pressure gas refrigerant 128 entering the compressor 122. The direction of flow of the refrigerant through the loop 126, as shown in FIG. 1, may be reversed to switch the heat transfer functions of the evaporator 118 and the condenser 120, and may enable the HVAC system 100 to operate in various operating modes.

The conditioner sub-system 104 includes a conditioner 136 (e.g., a three-way heat exchanger) and a conditioner heat transfer fluid loop 138 that circulates a conditioner heat transfer fluid (e.g., water, a glycol-based fluid, or any combination thereof) to and from the conditioner 136. Any suitable number of conditioners 136 (e.g., three-way heat exchangers) may be included in the conditioner sub-system 104. Where the conditioner sub-system 104 includes multiple conditioners 136, the conditioners may operate in series, in parallel, or any combination thereof.

The conditioner sub-system 104 interfaces with the refrigerant sub-system 102 via the evaporator 118. In particular, the evaporator 118 is included in the refrigerant loop 126 and the conditioner heat transfer loop 138, and facilitates transfer of heat from the conditioner heat transfer fluid in the loop 138 into the fluid refrigerant 134 in the refrigerant loop 126. The conditioner sub-system 104 may include additional components or other components than those shown and described with reference to FIG. 1. For example, the conditioner sub-system 104 may include one or more pumps (not shown) for circulating the conditioner heat transfer fluid in the loop 138 between the conditioner 136 and the evaporator 118. Suitable pumps that may be included in the conditioner sub-system 104 include, for example, centrifugal pumps, diaphragm pumps, positive displacement pumps, or any type of pump suitable for transferring liquid. The conditioner sub-system 104 may include additional heat transfer equipment that transfers heat from the conditioner heat transfer fluid into the atmosphere, or vice versa, depending on the operational requirements of the HVAC system 100 and other factors (e.g., a temperature and/or humidity of the first air inlet stream 110).

In operation of the conditioner sub-system 104, the conditioner heat transfer fluid in the loop 138 is channeled toward the evaporator 118. The conditioner heat transfer fluid is cooled in the evaporator 118 as heat is transferred from the conditioner heat transfer fluid into the fluid refrigerant 134 in the loop 126 to produce the gas refrigerant 128. Cooled conditioner heat transfer fluid 140 exiting the evaporator 118 is channeled toward and enters the conditioner 136. The first inlet air stream 110 is also directed through the conditioner 136. The conditioner 136 transfers heat from the first inlet air stream 110 into the conditioner heat transfer fluid 140, thus heating the conditioner heat transfer fluid.

The heated conditioner heat transfer fluid 142 exiting the conditioner 136 is channeled back toward the evaporator 118 and the process repeats.

The regenerator sub-system 106 includes a regenerator 144 (e.g., a three-way heat exchanger) and a regenerator heat transfer fluid loop 146 that circulates a regenerator heat transfer fluid (e.g., water, a glycol-based fluid, or any combination thereof) to and from the regenerator 144. Any suitable number of regenerators 144 may be included in the regenerator sub-system 106. Where the regenerator sub-system 106 includes multiple regenerators 144, the regenerators may operate in series, in parallel, or any combination thereof.

The conditioner 136 may include any suitable liquid desiccant system for dehumidifying the inlet air stream 110 and the regenerator 144 may include any suitable system for regenerating the liquid desiccant 152. Liquid desiccant dehumidification and/or regeneration systems may include vapor permeable membranes that separate the liquid desiccant from the air stream and allow moisture to transfer through the membrane, or may provide direct contact between the liquid desiccant and the air stream. In various examples, the conditioner 136 and/or the regenerator 144 may be a flat sheet membrane liquid desiccant system, a shell-in-tube liquid desiccant system, a liquid desiccant spray system, a packed bed system, or another suitable system that facilitates transferring heat and moisture between the inlet air stream 110 and the liquid desiccant 152 or 154.

In the example HVAC system 100, the conditioner 136 and the regenerator 144 are three-way heat exchangers. Example three-way heat exchangers that may be used as the conditioner 136 and/or the regenerator 144 are described in U.S. patent application Ser. No. 18/482,454, filed Oct. 6, 2023, U.S. patent application Ser. No. 18/490,984, filed Oct. 20, 2023, U.S. patent application Ser. No. 18/585,344, titled "THREE-WAY HEAT EXCHANGE MODULE WITH CONTROLLED FLUID FLOW," filed Feb. 23, 2024, U.S. patent application Ser. No. 18/390,475, titled "SYSTEMS AND METHODS FOR ASSEMBLING LIQUID DESICCANT AIR CONDITIONER PANELS USING FLEXIBLE ALIGNMENT FEATURES," filed Dec. 20, 2023, U.S. patent application Ser. No. 18/390,941, titled "LIQUID DESICCANT AIR CONDITIONER MODULES HAVING AERODYNAMIC FEATURES," filed Dec. 20, 2023, U.S. patent application Ser. No. 18/390,948, titled "LIQUID DESICCANT AIR CONDITIONER MODULES HAVING INTERLOCKING PANELS FOR CONTROLLING AIRFLOW," filed Dec. 20, 2023, and U.S. patent application Ser. No. 18/391,384, titled "LIQUID DESICCANT AIR CONDITIONER MODULES HAVING A LIQUID DESICCANT MIST TRAP," filed Dec. 20, 2023, the disclosures of which are incorporated by reference in their entirety.

In the example HVAC system 100, the regenerator sub-system 106 interfaces with the refrigerant sub-system 102 via the condenser 120. In particular, the condenser 120 is included in the refrigerant loop 126 and the regenerator heat transfer loop 146, and facilitates transfer of heat from the pressurized gas refrigerant 130 in the refrigerant loop 126 into the regenerator heat transfer fluid. The regenerator sub-system 106 may include additional components or other components than those shown and described with reference to FIG. 1. For example, the regenerator sub-system 106 may include one or more pumps (not shown) for circulating the regenerator heat transfer fluid in the loop 146 between the regenerator 144 and the condenser 120. Suitable pumps that may be included in the regenerator sub-system 106 include, for example, centrifugal pumps, diaphragm pumps, positive displacement pumps, or any type of pump suitable for transferring liquid. The regenerator sub-system 106 may include additional heat transfer equipment that transfers heat from the atmosphere into the regenerator heat transfer fluid, or vice versa, depending on the operational requirements of the HVAC system 100 and other factors (e.g., a temperature and/or humidity of the first air inlet stream 110).

In operation of the regenerator sub-system 106, the regenerator heat transfer fluid in the loop 146 is channeled toward the condenser 120. The regenerator heat transfer fluid is heated in the condenser 120 as heat is transferred from the pressurized gas refrigerant 130 in the loop 126 into the regenerator heat transfer fluid to produce the liquid refrigerant 132. Heated regenerator heat transfer fluid 148 exiting the condenser is channeled towards the regenerator 144. The second inlet air stream 114 is also directed through the regenerator 144. The regenerator 144 operates to transfer heat from the regenerator heat transfer fluid into the second inlet air stream 114, thus cooling the regenerator heat transfer fluid. The heated outlet air stream 116 exiting the regenerator 144 has a greater temperature than the second inlet air stream 114. The cooled regenerator heat transfer fluid 150 exiting the regenerator 144 is channeled back toward the condenser 120 and the process repeats.

The HVAC system 100 also includes the liquid desiccant circuit 108 that operates in conjunction with the sub-systems 102-106 to facilitate conditioning the first inlet air stream 110 by latent and sensible cooling. The liquid desiccant circuit 108 includes a liquid desiccant that is channeled between the conditioner 136 and the regenerator 144. Suitable liquid desiccants that may be used in the liquid desiccant circuit 108 include, for example, desiccant salt solutions, such as solutions of water and lithium chloride (LiCl), lithium bromide (LiBr), calcium chloride ($CaCl_2$)), or any combination thereof, triethylene glycol, sodium hydroxide, sulfuric acid, and so-called ionic liquid desiccants, or organic salts that are liquid at room temperature and have organic cations and organic or inorganic anions.

The liquid desiccant circuit 108 may include one or more pumps (not shown) for channeling the liquid desiccant between the conditioner 136 and the regenerator 144. Suitable pumps that may be included in the liquid desiccant circuit 108 include, for example, centrifugal pumps, diaphragm pumps, positive displacement pumps, or any type of pump suitable for transferring liquid. The liquid desiccant circuit 108 may include one or more pumps for transferring concentrated liquid desiccant 152 from the regenerator 144 toward the conditioner 136 and one or more pumps for transferring diluted (or saturated) liquid desiccant 154 from the conditioner 136 toward the regenerator 144.

Concentrated liquid desiccant 152 in the liquid desiccant circuit 108 is channeled toward the conditioner 136 of the conditioner sub-system 104, where the concentrated liquid desiccant 152 removes moisture from the first inlet air stream 110. The concentrated liquid desiccant 152 cooperates with the cooled conditioner heat transfer fluid 140 in the conditioner 136 to absorb heat and moisture from the first inlet air stream 110. The conditioned outlet air stream 112 exiting the conditioner 136 may have a lower humidity and/or a lower temperature than the first inlet air stream 110. The liquid desiccant, having absorbed moisture from the first inlet air stream 110, exits the conditioner 136 as diluted (or saturated) liquid desiccant 154.

The diluted (or saturated) liquid desiccant 154 is channeled toward the regenerator 144 of the regenerator sub-system 106, where the diluted liquid desiccant 154 rejects moisture into the second inlet air stream 114. The diluted liquid desiccant 154 cooperates with the heated regenerator heat transfer fluid 148 in the regenerator 144 to reject heat and moisture into the second inlet air stream 114. The heated outlet air stream 116 exiting the regenerator 144 thus has a greater humidity as well as a higher temperature than the second inlet air stream 114. The liquid desiccant, having rejected moisture into the second inlet air stream 114, exits the regenerator sub-system 106 as concentrated liquid desiccant 152. The concentrated liquid desiccant 152 exiting the regenerator 144 is channeled back toward the conditioner 136, and the process repeats.

The liquid desiccant circuit 108 may also include a desiccant-desiccant heat exchanger 156 for transferring heat from the concentrated liquid desiccant 152 that has exited the regenerator 144 to the diluted (or saturated) liquid desiccant 154 that has exited the conditioner 136. The desiccant-desiccant heat exchanger 156 may facilitate improving the functions of the liquid desiccant in the conditioner 136 and the regenerator 144. For example, the desiccant-desiccant heat exchanger 156 may reduce a temperature of the concentrated liquid desiccant 152 to provide greater cooling and dehumidifying capabilities of the conditioner 136. Additionally and/or alternatively, the desiccant-desiccant heat exchanger 156 may increase a temperature of the diluted liquid desiccant 154 to enable the diluted liquid desiccant 154 to desorb a greater amount of moisture in the regenerator 144. The desiccant-desiccant heat exchanger 156 may be an inline heat exchanger or any suitable heat exchanger that facilitates direct heat transfer between the concentrated liquid desiccant 152 and the diluted liquid desiccant 154. The desiccant-desiccant heat exchanger 156 may alternatively facilitate indirect heat exchange between the concentrated liquid desiccant 152 and the diluted liquid desiccant 154, such as via a vapor compression heat pump. Auxiliary heating and cooling sources (e.g., heating and cooling fluid, such as water) may also be utilized, in addition to or in lieu of the heat exchanger 156, to respectively heat the diluted liquid desiccant 154 and cool the concentrated liquid desiccant 152. The liquid desiccant circuit 108 may include additional components or other components than those shown and described with reference to FIG. 1.

Thus, in the example operating mode of the HVAC system 100, sensible cooling of the first inlet air stream 110 is facilitated by the conditioner 136 of the conditioner sub-system 104, which transfers heat from the inlet air stream 110 into the conditioner heat transfer fluid. The heat removed from the first inlet air stream 110 is then transferred sequentially between the sub-systems 104, 102, and 106 via the evaporator 118 and the condenser 120, and eventually is rejected into the second inlet air stream 114 via the regenerator 144. Latent cooling of the first inlet air stream 110 is also facilitated by the conditioner 136, which removes moisture from the inlet air stream 110 using the concentrated liquid desiccant 152. The moisture absorbed by the diluted (or saturated) liquid desiccant 154 is desorbed in the regenerator 144 into the second inlet air stream 114, which regenerates the concentrated liquid desiccant 152 that is then channeled back toward the conditioner 136.

The liquid desiccant 152 in the conditioner 136 may facilitate dehumidifying the outlet air stream 112 (also referred to as a treated air stream 112) to a desired dew point without overcooling the inlet air stream 110. Additionally, and/or alternatively, the treated air stream 112 may be dehumidified to a desired dew point without requiring the liquid desiccant 152 and/or the cooled heat transfer fluid 140 to be at or below the desired dew point. This may facilitate reducing costs and improving energy and/or operational efficiency over HVAC systems that do not utilize liquid desiccant, which otherwise require a working fluid (e.g., refrigerant or chilled water) to be at or below the desired dew point of the treated air stream when used to treat the inlet air stream. For example, to achieve a 55° F. dew point of the treated air stream 112, the liquid desiccant 152 may be at temperatures above 70° F., and in some cases even above 90° F. depending on the liquid desiccant used. In HVAC systems that do not use the liquid desiccant, the working fluid (e.g., refrigerant or chilled water) must be at or below 55° F. to achieve the desired dew point of the treated air stream. Therefore, in the example HVAC system 100, less energy is required to cool the liquid desiccant 152 and the refrigerant sub-system 102 can be operated more efficiently because the evaporator 118 is not needed to cool the heat transfer fluid 140 to a temperature below the desired dew point of the treated air stream 112.

In some instances, it may be desirable to treat the inlet air stream 110 in multiple stages to facilitate optimizing the efficiency, size, and/or operating costs of the HVAC system 100. For example, multi-stage treatment of the inlet air stream 110 may facilitate achieving a desired dew point while reducing the required capacity of the conditioner 136 (e.g., a three-way heat exchanger) to absorb moisture.

The capacity of the conditioner 136 to absorb moisture depends on various factors including the liquid desiccant used, the concentration of the liquid desiccant in the conditioner 136, the temperature of the liquid desiccant in the conditioner 136, the geometry of the conditioner 136 (which may determine the available surface area for transferring moisture between the liquid desiccant and the air stream), and a water vapor transfer rate of a vapor-permeable membrane (which may be determined by the membrane material used) positioned between the liquid desiccant and the air stream. Material costs may control the type of liquid desiccant and membrane material used, and a desired geometry (or footprint) of the conditioner 136 may control the available surface area of the membrane for transferring moisture between the liquid desiccant and the air stream in the conditioner 136. Reducing the material costs and/or footprint of the conditioner 136 may reduce the moisture absorption effectiveness of the conditioner 136, and these considerations may be balanced by lowering the temperature of the liquid desiccant and/or increasing the concentration of the liquid desiccant in the conditioner 136. However, these solutions may be limited. For example, if the temperature of the liquid desiccant is too low, this may negatively impact the efficiency and/or effectiveness of the conditioner 136, for example, by increasing the likelihood of overcooling the outlet air stream 112 and/or condensation from the inlet air stream 110 forming in the conditioner 136. Increasing the concentration of the liquid desiccant may require a greater energy load on and/or capacity of the other components of the HVAC system 100. For example, in the example system 100, increasing the concentration of the concentrated liquid desiccant 152 may require heating the diluted liquid desiccant 154 in the regenerator 144 to a higher temperature. Heating the diluted liquid desiccant 154 to higher temperatures to achieve a greater concentration of the concentrated liquid desiccant 152 may also lead to overcooling in the conditioner 136. The refrigerant sub-system 102 (e.g., a vapor-compression system) provides both the cooling capacity to cool the concentrated liquid desiccant 152 and the inlet air stream 110 (e.g., via the cooled conditioner heat transfer fluid 140), and the heating capacity to regenerate the diluted liquid desiccant 154 (e.g., via the heated regenerator heat transfer fluid 148). Increasing the heating capacity to heat the regenerator heat transfer fluid 148 may increase the cooling capacity to cool the conditioner heat transfer fluid 148, leading to overcooling in the conditioner 136.

Figure 7:
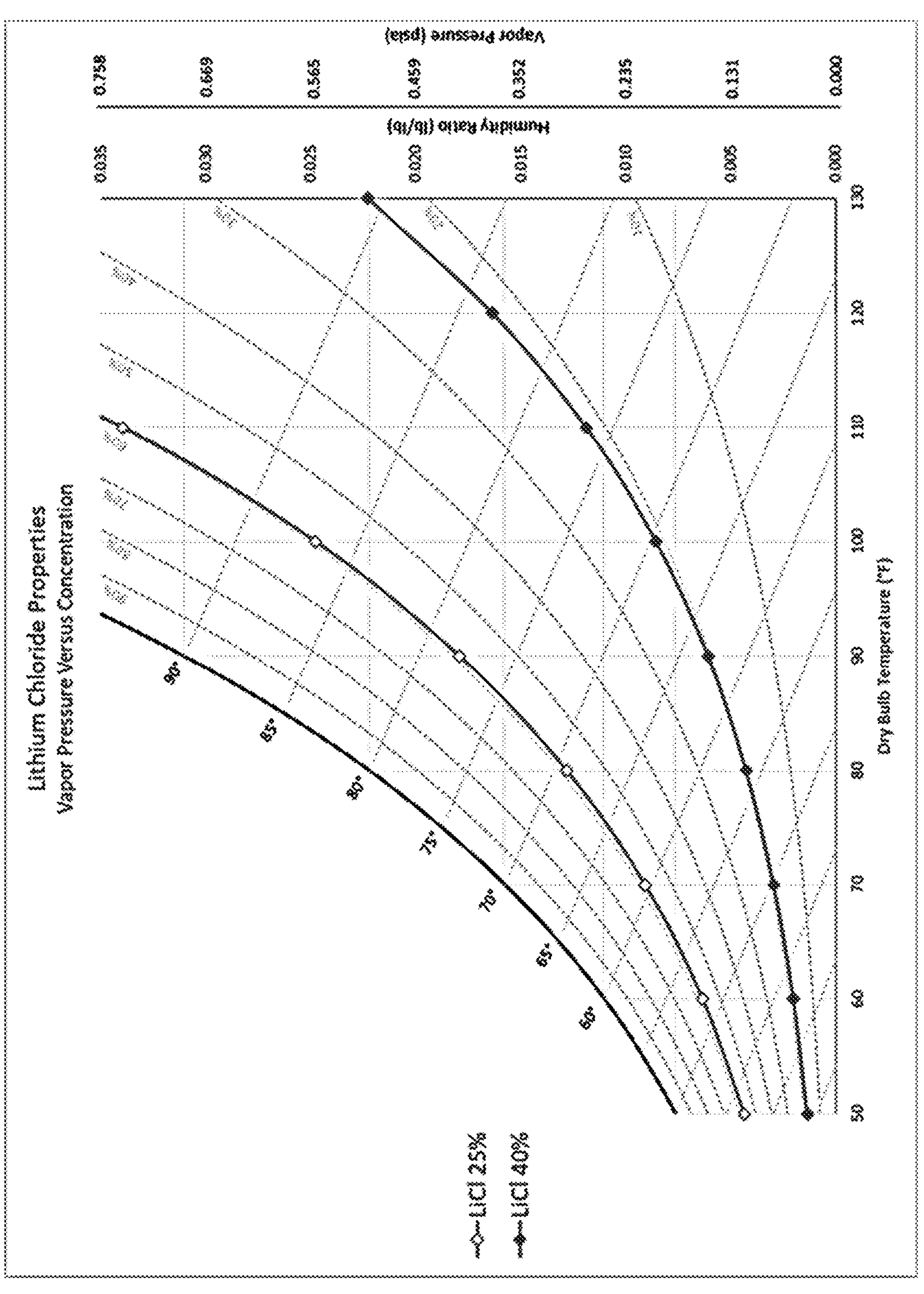
FIG. 7 is a plot of humidity and vapor pressure properties of lithium chloride at different concentrations and temperatures.
Figure 8:
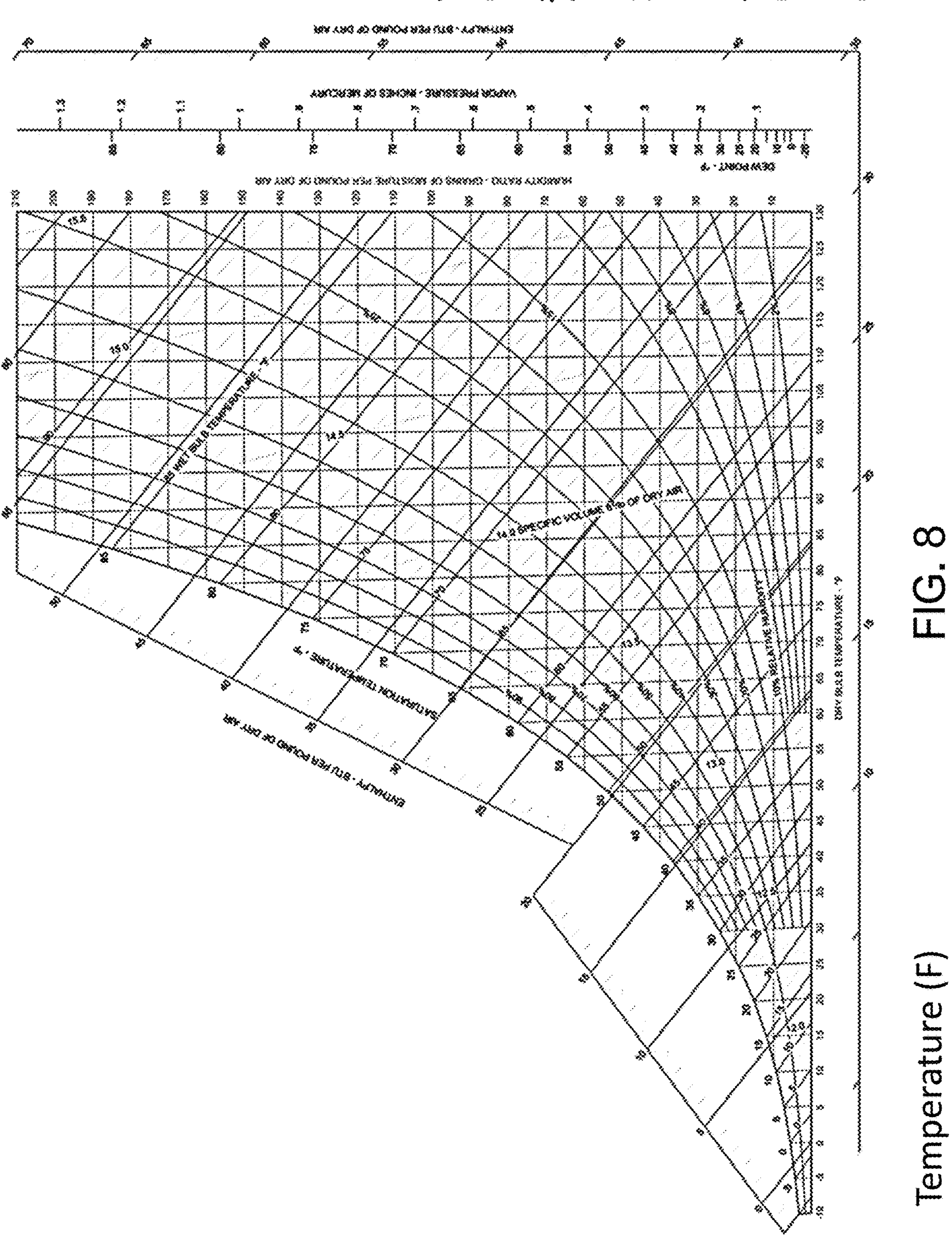
FIG. 8 is psychrometric chart of humid air.

Lowering the temperature and/or increasing the concentration of the liquid desiccant in the conditioner 136 may also have a limited or marginal impact on the capacity of the conditioner 136 to absorb moisture. To illustrate, reference is made to FIG. 7, which is a plot of humidity and vapor pressure properties of lithium chloride at different concentrations and temperatures. Liquid desiccant at a given temperature and concentration will reach a certain level of humidity with the air, which can be estimated by plotting lines of constant liquid desiccant concentration and varying temperature on a psychrometric chart for humid air (see FIG. 8), and generally following relative humidity lines. The "vapor pressure" of the liquid desiccant may be considered as the vapor pressure of the air in equilibrium with the liquid desiccant. Due to the slope of the concentration curves of lithium chloride shown in FIG. 7, increasing heat during regeneration substantially increases the concentration of the liquid desiccant. However, increasing the cold-side capacity (e.g., at the evaporator 118 for cooling the conditioner heat transfer fluid 140) will reduce the liquid desiccant temperature in the conditioner 136 without substantially reducing the vapor pressure of the liquid desiccant. Even increased concentration only has a mild impact on the vapor pressures of the liquid desiccant at colder temperatures. As a result, it can be predicted that the moisture absorption rate of the conditioner 136 will not substantially increase. In addition, the likelihood of temperatures of the liquid desiccant falling below the dew point of the air increases, increasing the propensity for overcooling and/or condensation in the conditioner 136. Accordingly, lowering the temperature and/or increasing the concentration of the liquid desiccant can only balance the other factors that determine the moisture absorption capacity of the conditioner 136 to a limited extent. This poses a limit to the ability to optimally balance system efficiency, equipment size (footprint), and manufacturing and operational costs of the conditioner sub-system 104, and the HVAC system 100 as a whole.

Figure 9:
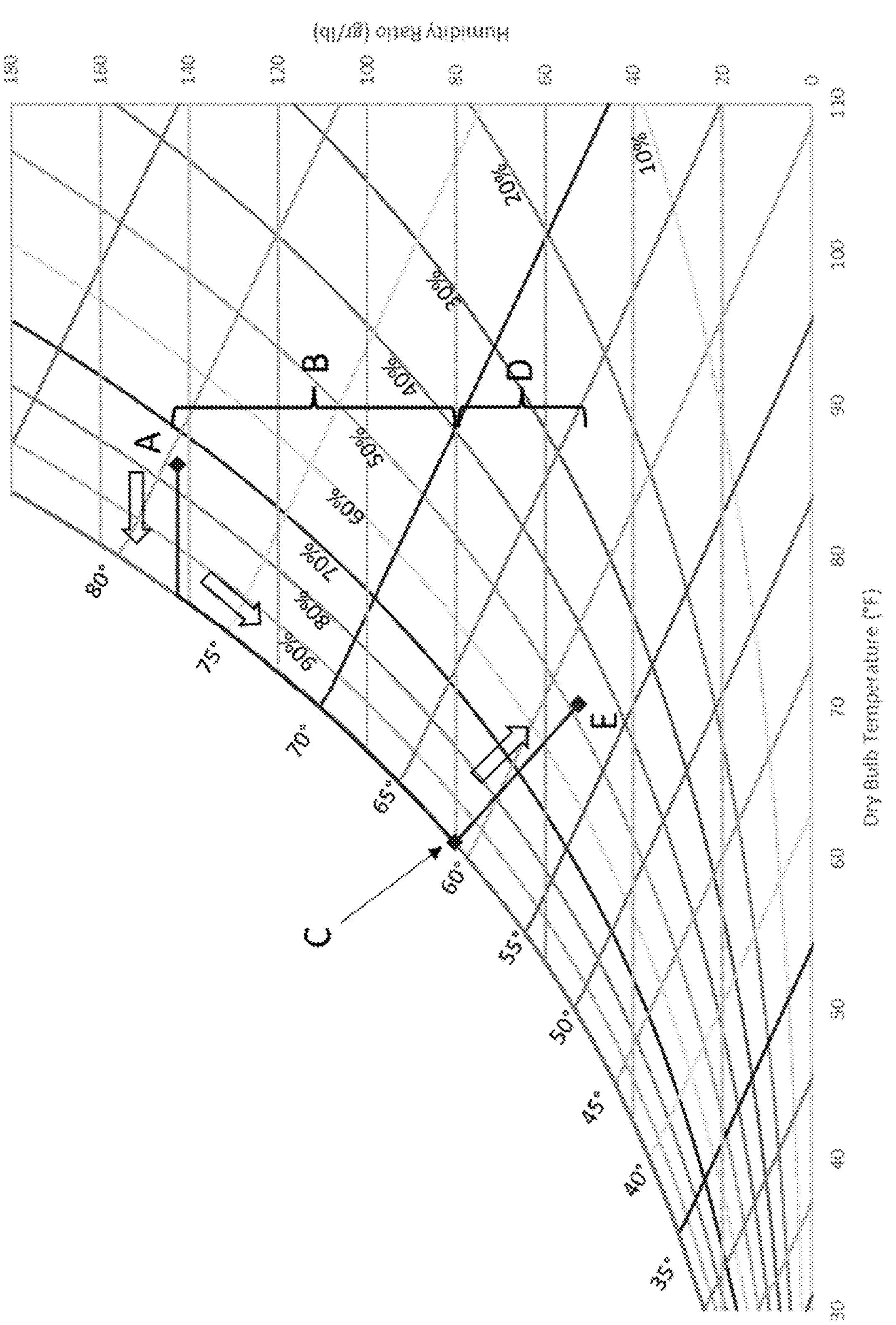
FIG. 9 is a humidity curve of air showing an example dehumidification process performed using a multi-stage configuration in accordance with the examples of FIGS. 2-5.

In the examples described below with reference to FIGS. 2-5, a pre-treatment heat exchanger 158 is used to pre-treat (e.g., cool and/or dehumidify) the inlet air stream 110 upstream of the conditioner 136 (indicated at 110*a* in FIGS. 2-5). The pre-treatment heat exchanger 158 may produce a pre-treated air stream (indicated at 110*b* in FIGS. 2-5) at suitable humidity and temperature conditions that lower the requisite moisture absorption capacity of the conditioner 136 having a given footprint (e.g., membrane surface area) to complete the dehumidification process (i.e., the required change in dew point for air at a given flow rate), and without increasing the likelihood of overcooling and condensation in the conditioner 136. In some examples, a target dew point of between about 60° F. to about 65° F. may be selected for the pre-treated air stream 110*b*, and a pre-treatment heat exchanger 158 may be implemented for an inlet air stream 110*a* with a humidity exceeding these conditions. FIG. 9 plots an example multi-stage dehumidification process (indicated by the arrows) in which the pre-treatment heat exchanger 158 and the conditioner 136 are used to dehumidify the inlet air stream 110*a* and produce the treated air stream 112. First, the pre-treatment heat exchanger 158 (e.g., a pre-cooling coil) is used to dehumidify the inlet air stream 110*a* to suitable pre-treated conditions. Second, the conditioner 136 is used to complete dehumidification process and produce the treated air stream 112. The region marked A indicates the conditions (temperature and humidity) of the inlet air stream 110*a* entering (or flowing across) the pre-treatment heat exchanger 158; the region marked B indicates the dehumidification performed using the pre-treatment heat exchanger 158; the region marked C indicates the conditions (temperature and humidity) of the pre-treated air stream 110*b* exiting the pre-treatment heat exchanger 158 and entering the conditioner 136; the region marked D indicates the dehumidification performed using the conditioner 136; and the region marked E indicates the conditions (temperature and humidity) of the treated air stream 112 exiting the conditioner 136.

Figure 2:
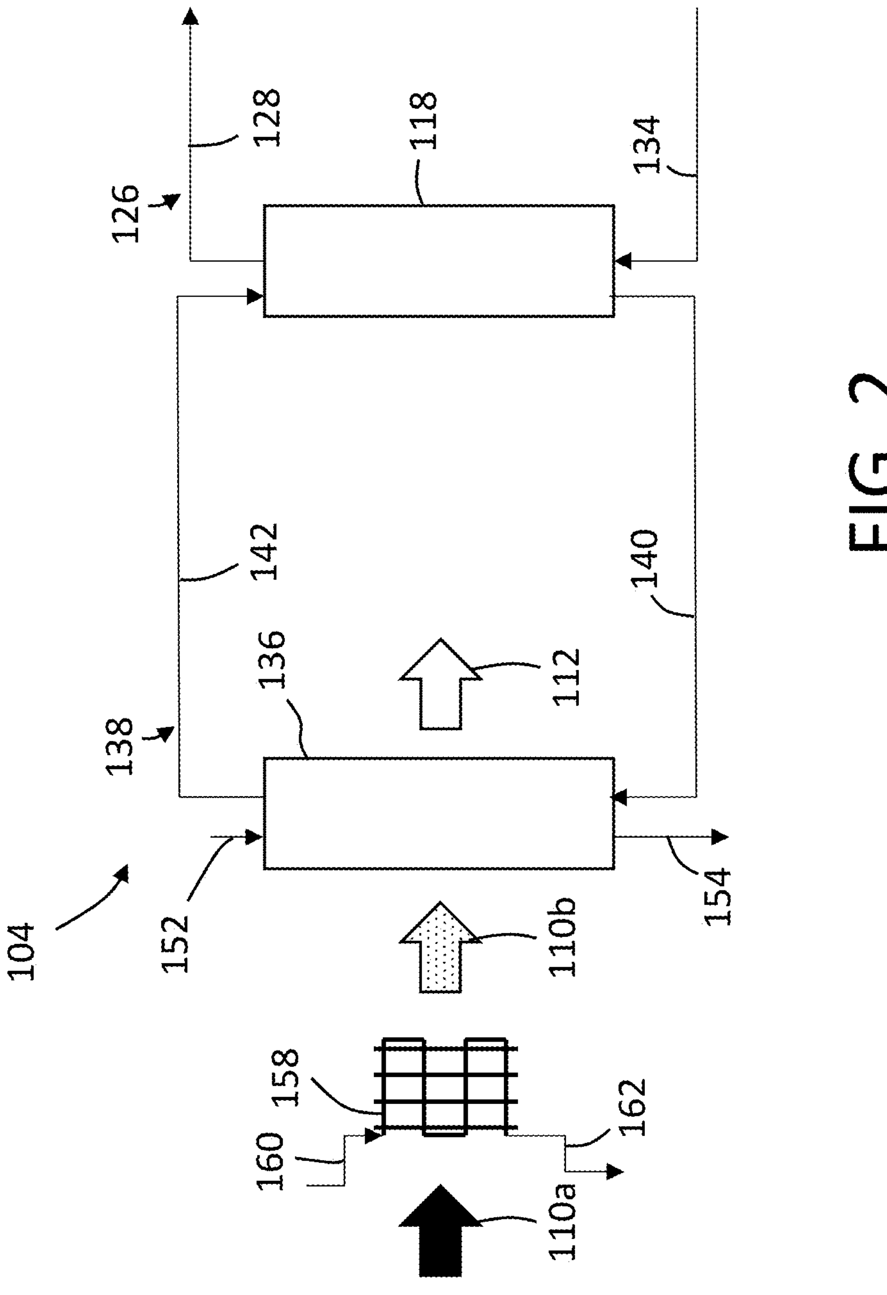
FIG. 2 is a schematic flow diagram of a portion of the HVAC system shown in FIG. 1, showing a first example of a multi-stage air treatment configuration in which an example pre-treatment heat exchanger is included and operable with a conditioner sub-system.

FIG. 2 depicts one example of a multi-stage configuration for dehumidifying the inlet air stream 110*a* using the pre-treatment heat exchanger 158 upstream from the conditioner 136 (e.g., a three-way heat exchanger). The pre-treatment heat exchanger 158 is a pre-cooling coil in this example. In other examples, any suitable pre-treatment equipment may be used. For example, the pre-treatment heat exchanger 158 may include an energy recovery ventilator (wheel or parallel plate), a heat pipe, a solid desiccant wheel, or the pre-cooling coil shown in FIG. 2. Although FIG. 2 depicts the pre-treatment heat exchanger 158 as part of a separate fluid circuit, the pre-treatment heat exchanger 158 may be included in the conditioner sub-system 104 (shown in FIGS. 3 and 4) or the refrigerant sub-system 102 (shown in FIG. 5). In some examples, a pre-treatment heat exchanger 158 may additionally and/or alternatively be used upstream from the regenerator 144 (e.g., a three-way heat exchanger) to facilitate optimizing the efficiency of the liquid desiccant regeneration operation.

In the example of FIG. 2, a working fluid 160 (e.g., chilled water, refrigerant, a glycol-based fluid, or a combination thereof) is channeled to the pre-treatment heat exchanger 158. The inlet air stream 110*a* flows through the pre-treatment heat exchanger 158 (e.g., across the coils with the working fluid 160 circulating therethrough) to produce a pre-treated air stream 110*b*. The working fluid 160 enters the pre-treatment heat exchanger 158 at a suitable temperature to facilitate lowering at least one of a temperature and a humidity of the pre-treated air stream 110*b*. In some examples, the temperature of the working fluid 160 may be at or below a desired dew point of the pre-treated air stream 110*b*. The dew point of the pre-treated air stream 110*b* may be selected to reduce the heat and/or mass transfer capacity required by the liquid desiccant 152 and the conditioner heat transfer fluid 140 in the conditioner 136, which may lower the likelihood for overcooling and/or condensation in the conditioner 136, and/or may lower the energy required to operate the other components of the HVAC system 100 shown in FIG. 1 (e.g., the liquid desiccant circuit 108 and/or the refrigerant sub-system 102).

The pre-treated air stream 110*b* is channeled toward the conditioner 136 having a lower temperature and/or humidity than the inlet air stream 110*a*. Moisture in the inlet air stream 110*a* may condense on the coils of the pre-treatment heat exchanger 158 and/or heat from the inlet air stream 110*a* may be transferred into the working fluid 162 which exits the pre-treatment heat exchanger 158 at a higher temperature than the inlet working fluid 160. The pre-treated air stream 110*b* flows through the conditioner 136 in which the liquid desiccant 152 and the conditioner heat transfer fluid 136 cooperate to absorb heat and moisture from the pre-treated air stream 110*b*, producing the treated air stream 112 having the desired characteristics (e.g., dew point). The liquid desiccant 152 and the conditioner heat transfer fluid 140 may suitably enter the conditioner 136 at a temperature higher than the desired dew point of the treated air stream 112 due to the moisture absorbing capability of the liquid desiccant. A lower moisture content in the pre-treated air stream 110*b* may also facilitate lowering the likelihood for condensate to accumulate within the conditioner 136 (e.g., on vapor-permeable membranes that facilitate moisture transfer between the air stream and the liquid desiccant) which may otherwise negatively impact performance of the conditioner.

Figure 3:
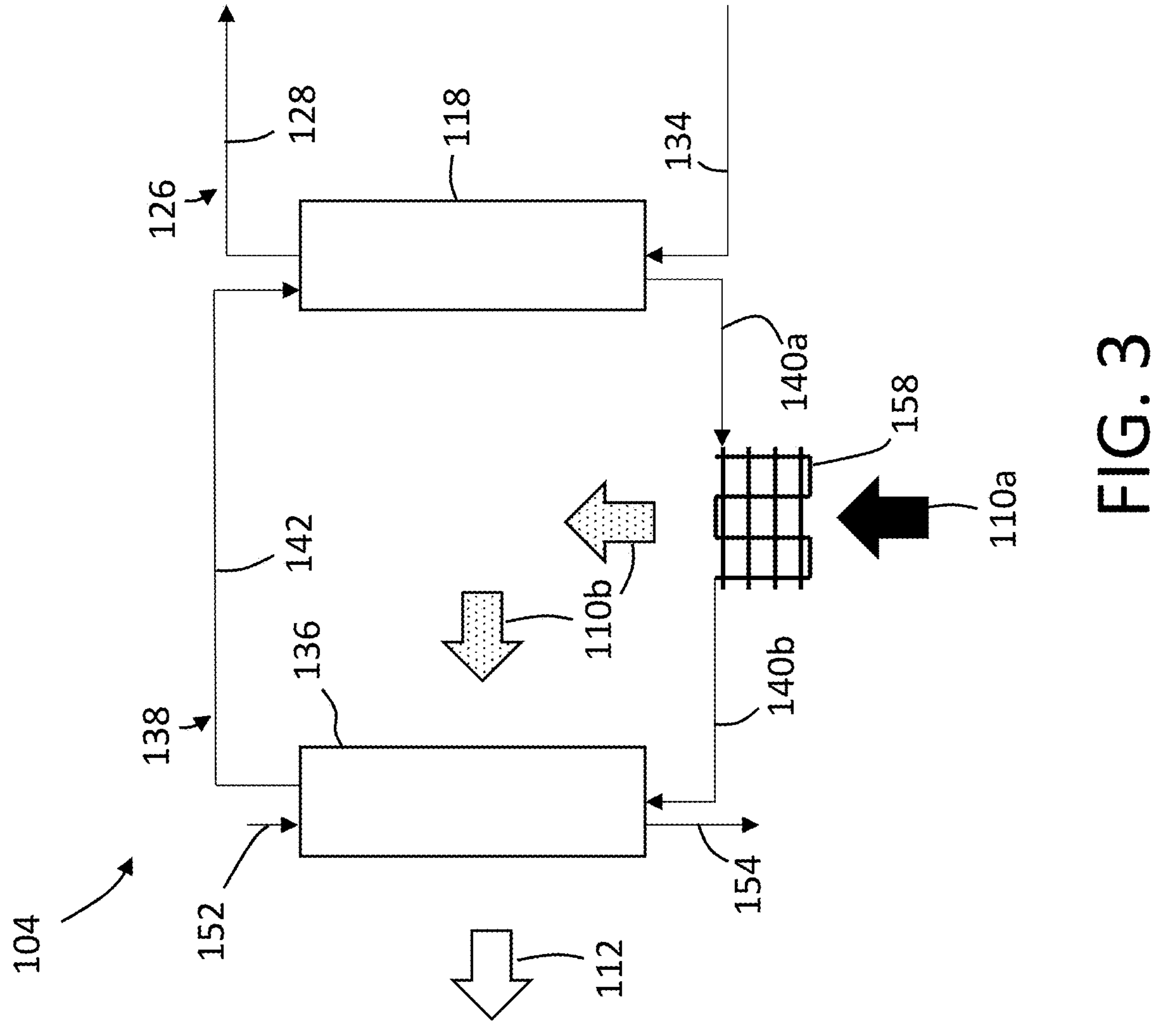
FIG. 3 is another schematic flow diagram of the portion of the HVAC system shown in FIG. 2, showing a second example of the multi-stage air treatment configuration.

FIG. 3 is another example multi-stage configuration for treating the inlet air stream 110*a*. In this example, the pre-treatment heat exchanger 158 is positioned on the conditioner heat transfer fluid loop 138 between the evaporator 118 and the conditioner 136. The pre-treatment heat exchanger 158 operates as described above, and in this example uses a first portion of the cooled conditioner heat transfer fluid 140*a* exiting the evaporator 118 to produce the pre-treated air stream 110*b*. A second portion of the cooled conditioner heat transfer fluid 140*b* exiting the pre-treatment heat exchanger 158 is then channeled to the conditioner 136. This configuration may facilitate conserving heat transferred within the HVAC system 100 by not using an auxiliary working fluid outside of the fluid loops 126, 138, and 146 (shown in FIG. 1). The conditioner heat transfer fluid 140*b* may be at a higher temperature than the conditioner heat transfer fluid 140*a*, but the pre-treated air stream 110*b* having the lowered temperature and/or moisture content may enable the higher temperature heat transfer fluid 140*b* in the conditioner 136 while still achieving the desired dew point of the treated air stream 112.

In some instances, for example in the configuration shown in FIG. 3, it may be desirable to bypass the pre-treatment heat exchanger 158 depending on the operating conditions of the HVAC system 100. For example, where the inlet air stream 110*a* has a dew point lower than the temperature of the first portion of the conditioner heat transfer fluid 140*a* upstream from the pre-treatment heat exchanger 158, it is likely that the pre-treatment heat exchanger 158 will not remove any moisture from the inlet air stream 110*a*. In such instances, the pre-treatment heat exchanger 158 may have relatively little use in improving system efficiency, and it may be desirable to bypass the pre-treatment heat exchanger in the interest of other factors that affect system efficiency. Non-limiting examples of such factors may include reducing or eliminating a pressure drop that the conditioner heat transfer fluid 140*a*, 140*b* experiences across the pre-treatment heat exchanger 158, reducing power consumption of the pump(s) of the conditioner heat transfer fluid loop 138, and/or conserving the heat transfer capabilities of the cooled conditioner heat transfer fluid 140*a* for cooperating with the liquid desiccant 152 in the conditioner 136.

Figure 4:
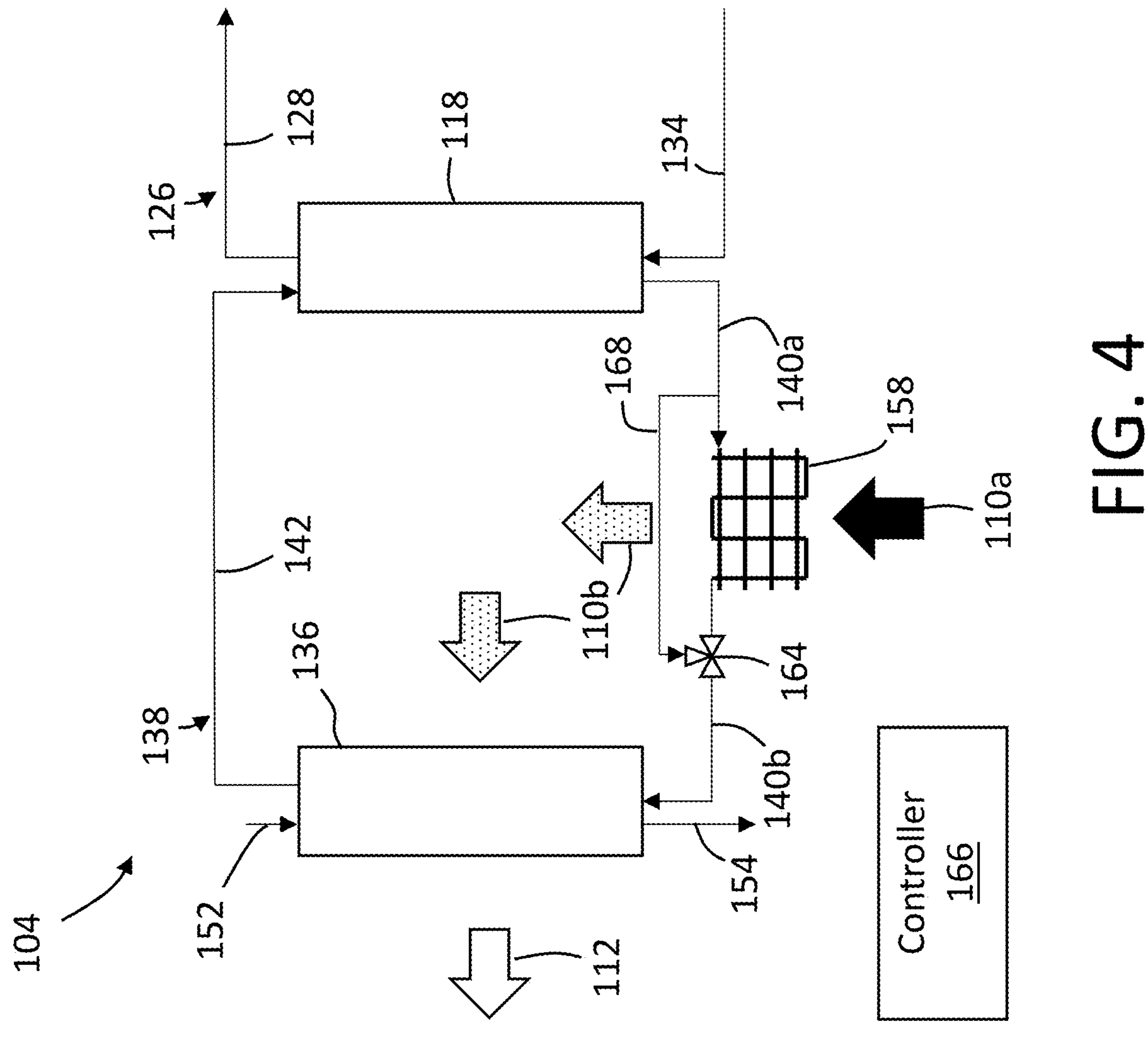
FIG. 4 is another schematic flow diagram of the portion of the HVAC system shown in FIGS. 2 and 3, showing a third example of the multi-stage air treatment configuration.

FIG. 4 shows the multi-stage configuration of FIG. 3 in which a bypass valve 164 is included for selectively bypassing the pre-treatment heat exchanger 158. The bypass valve 164 may be selectively opened at certain operating conditions of the HVAC system 100 (e.g., at certain dew points of the inlet air stream 110*a*) to route the conditioner heat transfer fluid 140*a* around the pre-treatment heat exchanger 158 via a bypass line 168. As shown in FIG. 4, the bypass valve 164 is positioned downstream from the pre-treatment heat exchanger 158. In this example, the bypass valve 164 may be a mixing valve and selectively operable to modulate flow of the conditioner heat transfer fluid 140*a* through the pre-treatment heat exchanger 158 and/or the bypass line 168. That is, a position of the bypass valve 164 may be adjusted to allow the conditioner heat transfer fluid 140*a* to substantially entirely flow through the pre-treatment heat exchanger 158, to route the conditioner heat transfer fluid 140*a* substantially entirely through the bypass line 168 around the pre-treatment heat exchanger, or to allow some of the conditioner heat transfer fluid 140*a* to flow through each of the pre-treatment heat exchanger and the bypass line. In other examples, the bypass valve 164 may be located upstream from the pre-treatment heat exchanger 158. In these examples, the bypass valve 164 may be a diverting valve that is operable to allow the conditioner heat transfer fluid 140*a* to substantially entirely flow through the pre-treatment heat exchanger 158, or to route the conditioner heat transfer fluid 140*a* substantially entirely through the bypass line 168 around the pre-treatment heat exchanger.

A controller 166 may be connected in communication for selectively operating the bypass valve 164 depending on the operating conditions of the HVAC system 100. The controller 166 may be connected in communication with one or more sensors (e.g., temperature sensors, humidity sensors, pressure sensors) for detecting the operating conditions of the HVAC system 100 and determining whether to activate the bypass valve 164. In some examples, the controller 166 may activate the bypass valve 164 to route at least a portion of the conditioner heat transfer fluid 140*a* around the pre-treatment heat exchanger 158 based on the dew point of the inlet air stream 110*a*. The controller 166 may also compare a target dew point of the treated air stream 112 and the dew point of the inlet air stream 110*a* to predetermined set points and, based on the comparison, determine whether to activate the bypass valve 164. As an example, for a target dew point of the treated air stream 112 at or below a set point of between about 55° F. to about 60° F., the controller 166 may determine to activate the bypass valve 164 when the inlet air stream 110*a* has a dew point at or above a set point of between about 60° F. to about 65° F. The controller 166 may also operate the bypass valve 164 to modulate the amount of conditioner heat transfer fluid 140*a* flowing through each of the pre-treatment heat exchanger 158 and the bypass line 168 based on a degree of deviation of the target dew point of the treated air stream 112 and/or the dew point of the inlet air stream 110*a* from a given set point. For example, depending on the target dew point of the treated air stream 112 and/or the dew point of the inlet air stream 110*a*, the controller 166 may operate the bypass valve 164 to allow a significant portion, or all, the conditioner heat transfer fluid 140*a* to flow through the pre-treatment heat exchanger 158, to split the flow of the conditioner heat transfer fluid 140*a* between the pre-treatment heat exchanger 158 and the bypass line 168, or to route a significant portion, or all, the conditioner heat transfer fluid 140*a* through the bypass line 168.

Figure 5:
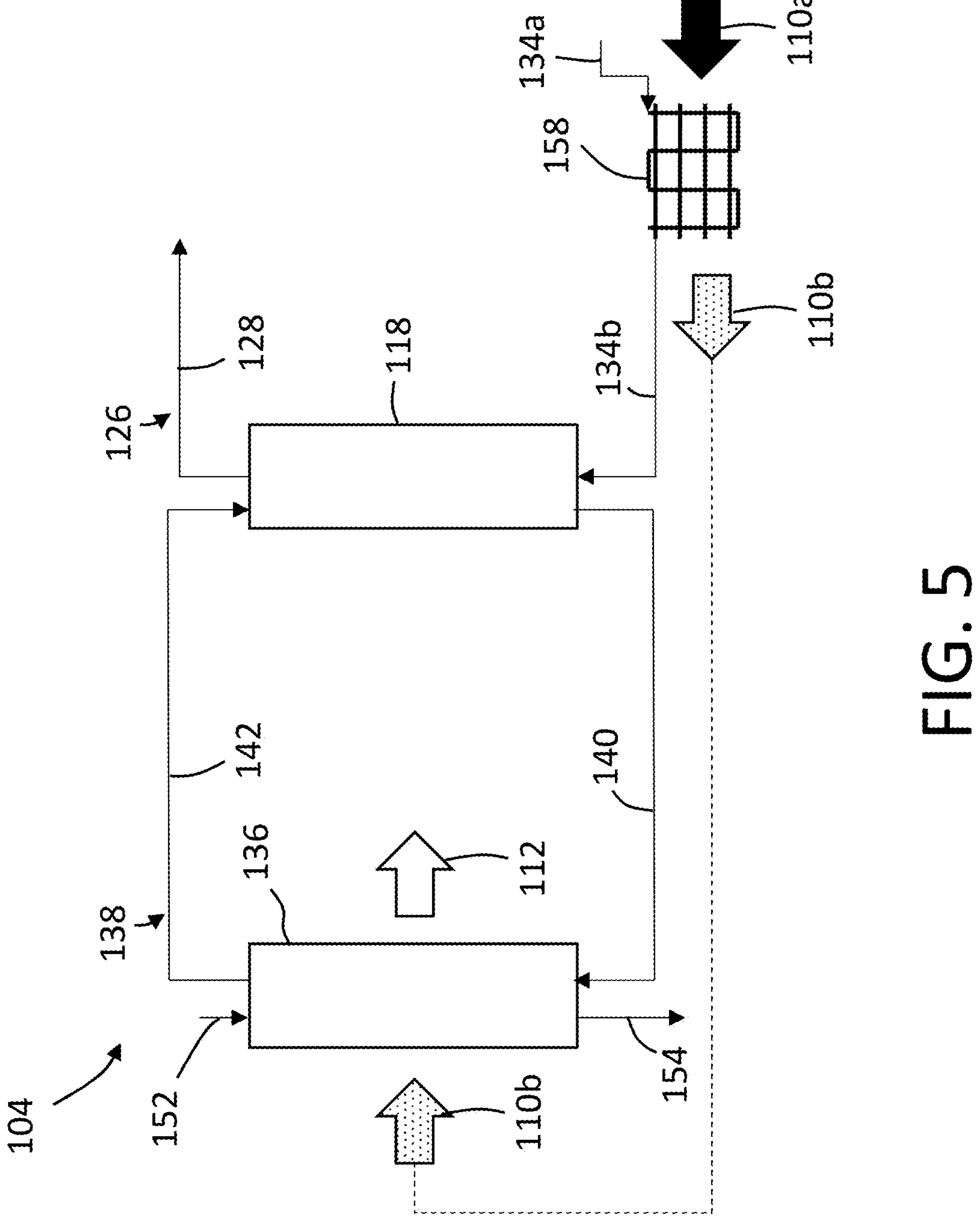
FIG. 5 is another schematic flow diagram of the portion of the HVAC system shown in FIGS. 2-4, showing a fourth example of the multi-stage air treatment configuration.

FIG. 5 is another example multi-stage configuration for treating the inlet air stream 110*a*. In this example, the pre-treatment heat exchanger 158 is positioned in the refrigerant sub-system 102, for example, between the evaporator 118 and the condenser 120 (shown in FIG. 1). In some examples, the pre-treatment heat exchanger 158 may be the evaporator 118 in the refrigerant sub-system 102 (or the condenser 120 if used in conjunction with the regeneration sub-system 106). The pre-treatment heat exchanger 158 operates as described above, and in this example uses a first portion of the expanded refrigerant 134*a* exiting the expansion valve 124 to produce the pre-treated air stream 110*b*. The pre-treatment heat exchanger 158 may also be located upstream from the expansion valve 124 and operates using high pressure refrigerant 132 exiting the condenser 120. In this example, a second portion of the expanded refrigerant 134*b* exiting the pre-treatment heat exchanger 158 is then channeled to the evaporator 118. This configuration may, similar to the configuration of FIGS. 3 and 4, facilitate conserving heat transferred within the HVAC system 100 by not using an auxiliary working fluid outside of the fluid loops 126, 138, and 146 (shown in FIG. 1). Heat transferred at this stage may reduce the capacity of the evaporator 118 for cooling the conditioner heat transfer fluid 140, but the pre-treated air stream 110*b* having the lowered temperature and/or moisture content may enable a higher temperature of the conditioner heat transfer fluid 140 entering the conditioner 136 while still achieving the desired dew point set point of the treated air stream 112.

Figure 6:
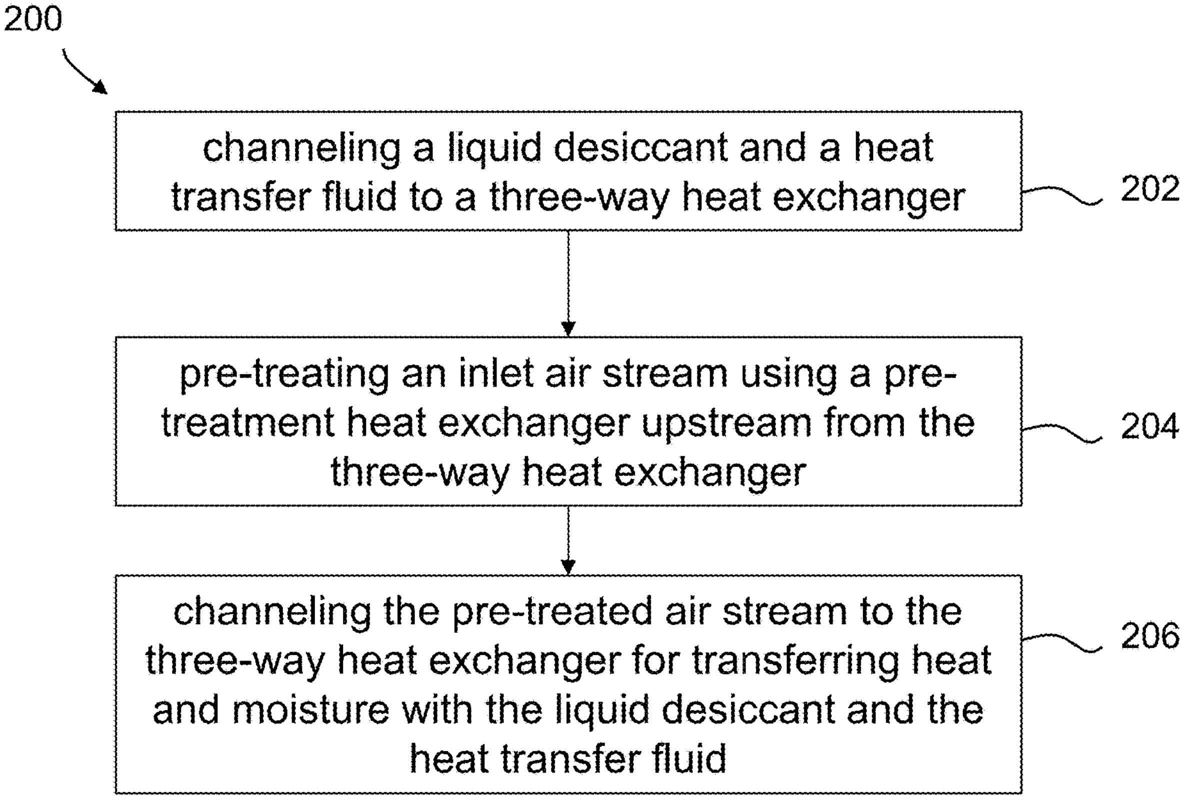
FIG. 6 is an example method of operating an air treatment system.

FIG. 6 is an example method 200 of operating an air treatment system (e.g., the conditioner sub-system 104). The method 200 includes channeling 202 a liquid desiccant and a heat transfer fluid to a three-way heat exchanger (e.g., the conditioner 136). The method 200 also includes pre-treating 204 an inlet air stream (e.g., the inlet air stream 110*a*) using a pre-treatment heat exchanger 158 upstream from the three-way heat exchanger to lower at least one of a temperature and a humidity of the inlet air stream 110*a* and produce a pre-treated air stream 110*b*. In some examples, the method 200 may include pre-treating 204 the inlet air stream 110*a* by transferring heat from the inlet air stream 110*a* to the heat transfer fluid (e.g., the cooled conditioner heat transfer fluid 140*a*) upstream from the three-way heat exchanger. The heat transfer fluid entering the pre-treatment heat exchanger 158 may have a temperature at or below a dew point of the pre-treated air stream 110*b*. The method 200 also includes channeling 206 the pre-treated air stream 110*b* to the three-way heat exchanger for transferring heat and moisture between the liquid desiccant, the heat transfer fluid, and the pre-treated air stream, producing a treated air stream 112. Each of the heat transfer fluid and the liquid desiccant entering the three-way heat exchanger have a temperature above a dew point of the treated air stream 112, which may be enabled by the dehumidification capability of the liquid desiccant. Depending on operating conditions of the HVAC system 100 (e.g., a dew point of the inlet air stream 110*a*, or a difference between a target dew point of the treated air stream 112 and/or a dew point of the inlet air stream 110*a* and a given dew point set point), the method 200 may include selectively bypassing the pre-treatment heat exchanger 158 (e.g., by selectively routing the heat transfer fluid around the pre-treatment heat exchanger via a bypass line).

Example HVAC systems described include an air treatment system for transferring heat and moisture between a liquid desiccant, a heat transfer fluid, and air. Example air treatment systems include a three-way heat exchanger that facilitates the heat and moisture transfer. The liquid desiccant improves system efficiency by its moisture absorbing capabilities which facilitate producing treated (e.g., conditioned or dehumidified) air at liquid desiccant temperatures above a desired dew point of the treated air. The system efficiency, equipment size (footprint), and/or manufacturing and operational costs of liquid desiccant dehumidification systems may be enhanced and/or optimally balanced using pre-treatment equipment upstream from the three-way heat exchanger for producing a pre-treated air stream before transferring heat and moisture in the three-way heat exchanger. For example, a pre-treatment heat exchanger may be included for producing a pre-treated air stream having a lower temperature and/or humidity upstream from the three-way heat exchanger. Using the pre-treatment heat exchanger to produce the pre-treated air stream may reduce the capacity requirements and/or energy load required to otherwise achieve a desired dew point of the treated air stream. In some implementations, moisture in the inlet air stream entering the pre-treatment heat exchanger may condense (e.g., on coils of the pre-treatment heat exchanger) out of the pre-treated air stream upstream from the three-way heat exchanger, reducing the propensity for condensate to accumulate within the three-way heat exchanger (e.g., on one or more membranes in the heat exchanger) and negatively affect performance. The pre-treatment heat exchanger may be strategically positioned in the HVAC system (e.g., on a heat transfer fluid loop or a refrigerant loop) for conserving heat transfer in the HVAC system. In some examples, a selectively operable bypass valve for bypassing the pre-treatment heat exchanger may be included and may be activated depending on the operating conditions of the HVAC system to facilitate reducing energy costs and improving system efficiency.

Example embodiments of HVAC systems and methods of operating the systems are described above in detail. The systems and methods are not limited to the specific embodiments described herein, but rather, components of the system and methods may be used independently and separately from other components described herein. For example, the systems described herein may be used in systems other than HVAC systems.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", "vertical", "lateral", "longitudinal", etc.) is for convenience of description and does not require any particular orientation of the item described.

The terms "about," "substantially," "essentially" and "approximately," and their equivalents, when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

As various changes could be made in the above constructions and methods without departing from the scope of the disclosure, all matter contained in the above description and shown in the accompanying drawing(s) shall be interpreted as illustrative and not in a limiting sense.

What is claimed is:

1. An air treatment system comprising:

a three-way heat exchanger operable to transfer heat and moisture between air, a liquid desiccant, and a heat transfer fluid;

a heat transfer fluid loop for circulating the heat transfer fluid between the three-way heat exchanger and a second heat exchanger operable to transfer heat between the heat transfer fluid and a third working fluid; and a pre-treatment heat exchanger positioned on the heat transfer fluid loop between the second heat exchanger and the three-way heat exchanger, wherein the pre-treatment heat exchanger is operable to transfer heat between the air and the heat transfer fluid upstream from the three-way heat exchanger.

2. The air treatment system of claim 1, wherein the pre-treatment heat exchanger is a pre-cooling coil operable to lower at least one of a temperature and a humidity of the air upstream from the three-way heat exchanger.

3. The air treatment system of claim 1, further comprising a bypass valve positioned on the heat transfer fluid loop upstream from the pre-treatment heat exchanger.

4. The air treatment system of claim 3, further comprising a controller operable to activate the bypass valve for bypassing the pre-treatment heat exchanger based on an operating condition of the air treatment system.

5. The air treatment system of claim 4, wherein the operating condition comprises a dew point of the air.

6. The air treatment system of claim 1, wherein the pre-treatment heat exchanger is operable with the heat transfer fluid having an inlet temperature at or below a dew point of the air exiting the pre-treatment heat exchanger and the three-way heat exchanger is operable with each of the heat transfer fluid and the liquid desiccant having an inlet temperature above a dew point of the air exiting the three-way heat exchanger.

7. A heating, ventilation, and air conditioning (HVAC) system comprising:

a refrigerant sub-system operable to circulate a refrigerant between an evaporator and a condenser; and an air treatment sub-system comprising:

a three-way heat exchanger operable to transfer heat and moisture between air, a liquid desiccant, and a heat transfer fluid; and a heat transfer fluid loop for circulating the heat transfer fluid between the three-way heat exchanger and the evaporator for transferring heat between the heat transfer fluid and the refrigerant; and a pre-treatment heat exchanger operable to transfer heat between the air and one of the refrigerant and the heat transfer fluid upstream from the three-way heat exchanger.

8. The HVAC system of claim 7, wherein the pre-treatment heat exchanger is positioned on the heat transfer fluid loop and operable to transfer heat between the air and the heat transfer fluid.

9. The HVAC system of claim 8, wherein the pre-treatment heat exchanger is a pre-cooling coil operable to lower at least one of a temperature and a humidity of the air upstream from the three-way heat exchanger.

10. The HVAC system of claim 8, further comprising a bypass valve positioned on the heat transfer fluid loop upstream from the pre-treatment heat exchanger.

11. The HVAC system of claim 10, further comprising a controller operable to activate the bypass valve for bypassing the pre-treatment heat exchanger based on an operating condition of the HVAC system.

12. The HVAC system of claim 11, wherein the operating condition comprises a dew point of the air.

13. The HVAC system of claim 7, wherein the pre-treatment heat exchanger is positioned in the refrigerant sub-system and operable to transfer heat between the air and the refrigerant.

14. The HVAC system of claim 13, wherein the pre-treatment heat exchanger is an auxiliary air-to-refrigerant heat exchanger positioned between the condenser and the evaporator and operable to lower at least one of a temperature and a humidity of the air upstream from the three-way heat exchanger.

15. The HVAC system of claim 7, wherein the pre-treatment heat exchanger is operable with the one of the heat transfer fluid and the refrigerant having an inlet temperature at or below a dew point of the air exiting the pre-treatment heat exchanger and the three-way heat exchanger is operable with each of the heat transfer fluid and the liquid desiccant having an inlet temperature above a dew point of the air exiting the three-way heat exchanger.

16. The HVAC system of claim 7, further comprising a liquid desiccant circuit operable to circulate the liquid desiccant to and from the three-way heat exchanger.

17. The HVAC system of claim 16, further comprising a regeneration sub-system for regenerating the liquid desiccant exiting the three-way heat exchanger.

18. A method of operating an air treatment system, the method comprising:

channeling a liquid desiccant and a heat transfer fluid to a three-way heat exchanger;

pre-treating an inlet air stream using a pre-treatment heat exchanger upstream from the three-way heat exchanger to lower at least one of a temperature and a humidity of the inlet air stream, wherein pre-treating the inlet air stream comprises transferring heat from the inlet air stream to the heat transfer fluid upstream from the three-way heat exchanger; and channeling the pre-treated air stream to the three-way heat exchanger for transferring heat and moisture between the liquid desiccant, the heat transfer fluid, and the pre-treated air stream, producing a treated air stream.

19. The method of claim 18, wherein the heat transfer fluid entering the pre-treatment heat exchanger has a temperature at or below a dew point of the pre-treated air stream and each of the heat transfer fluid and the liquid desiccant entering the three-way heat exchanger have a temperature above a dew point of the treated air stream.

* * * * *